Dec. 13, 1955    J. E. SUNDERLIN    2,727,160

PULSE GENERATOR

Filed Jan. 18, 1955

WITNESSES:
E. A. McClosky.
T. H. Murray

INVENTOR
Joseph E. Sunderlin.
BY
J. E. Crowder
ATTORNEY

United States Patent Office 2,727,160
Patented Dec. 13, 1955

2,727,160

PULSE GENERATOR

Joseph E. Sunderlin, Baltimore, Md., assignor to Westinghouse Electric Corporation, East Pittsburgh, Pa., a corporation of Pennsylvania Application January 18, 1955, Serial No. 482,463

12 Claims. (Cl. 307—106)

This invention relates to pulse generating circuits and more particularly to pulse generating circuits for use with a magnetron or other similar device.

When the load for a pulse generating circuit is a magnetron or some similar device which offers a substantially infinite inverse impedance to charging currents, it is usually necessary to provide some means whereby the charging currents may by-pass the magnetron or load during the charging period of the energy storing device of the circuit. Otherwise, the high impedance which would be offered to charging currents by the load would materially impede the charging action and make the circuit inoperable for its intended function. On the other hand, when the energy storing device discharges after the aforesaid charging period, the discharge currents must be channeled through the load to produce an output voltage pulse. This means that the apparatus for by-passing currents during the charging period must now present an impedance which is higher than that of the load.

Accordingly, an object of this invention lies in the provision of means in a pulse generating circuit which presents a low impedance to charging currents for an energy storing device and a high impedance to discharge currents which pass through a load.

Another object of the invention is to provide an improved pulse generator using capacitors and saturating inductors exclusively as elements. In this way the overall size of the generator is reduced; and, in addition, the susceptibility of the generator to damage is greatly reduced over pulse generators using vacuum or gas tubes.

Figure 1:
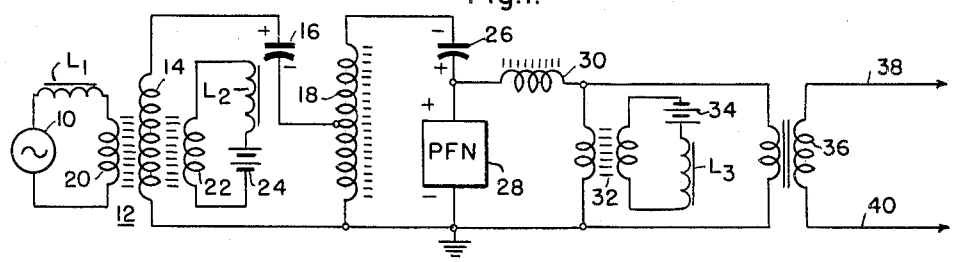
Figure 2:
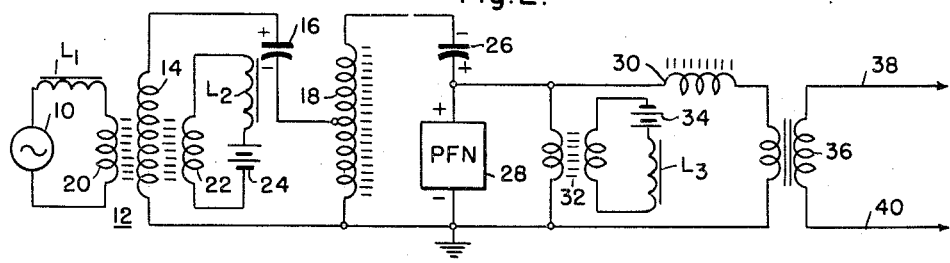
Figure 3:
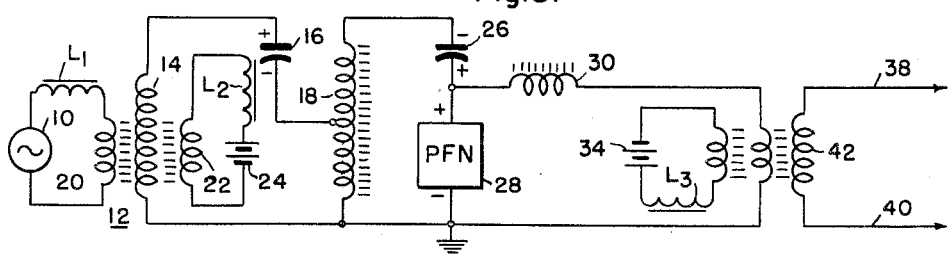
Figure 4A:
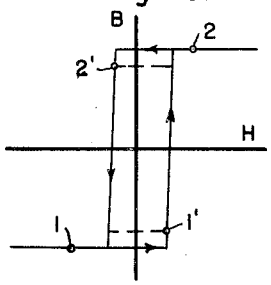
Figure 4B:
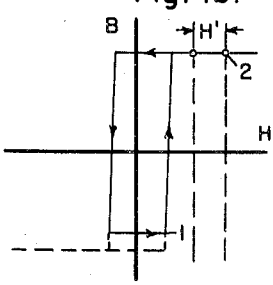

The details of the invention, both as to its organization and method of operation, together with further objects and advantages thereof, may best be understood by reference to the following description taken in connection with the accompanying drawings, and in which:

Figure 1 illustrates one embodiment of the invention;
Fig. 2 is a modification of Fig. 1;
Fig. 3 illustrates still another embodiment of the invention; and
Figs. 4a and 4b show hysteresis loops of the magnetic core material employed in the various saturable reactors and transformers of the invention.

Referring to Fig. 1, the circuit shown includes a source of alternating current voltage 10 which is inductively coupled by means of saturable transformer 12 to a closed circuit comprising secondary winding 14, capacitor 16, and the lower portion of saturable reactor 18. Transformer 12 is wound on a core of square hysteresis loop material, hereinafter described, and includes a primary winding 20, the secondary winding 14 and a tertiary winding 22 to which a source of saturating potential, such as battery 24, is connected. Input choke coil $L_1$ serves two purposes: (1) It forms a resonant charging circuit with capacitor 16, thereby providing efficient charging of the capacitor at the frequency of the applied signal; and (2) It prevents voltage source 10 from being loaded excessively when capacitor 16 discharges through the low impedance presented by transformer 12 when it saturates. In a similar manner, choke coil $L_2$ prevents excessive AC currents from flowing through battery 24 in the bias circuit. The transformer 12, although disclosed as a conventional multi-winding unit, may comprise an autotransformer if desired.

Between the opposite ends of saturable reactor 18 are connected a second capacitor 26 and a pulse forming network (PFN) 28, shown in block form. Pulse forming networks are well known in the art and consist of inductances and condensers which may be put together in any one of a number of possible configurations. The configuration chosen for the particular purpose at hand depends primarily upon the specific pulser characteristic desired. The values of the inductance and capacitance elements in such a network can be calculated to give an arbitrary pulse shape when the pulse duration, impedance, and load characteristics are specified. For a full and detailed description of the theory and construction of various types of pulse forming networks, reference may be had to volume 5 (Pulse Generators) of the MIT Radiation Laboratory Series, McGraw-Hill Book Company, Inc., New York, 1948. For purposes of the present description, however, it should be sufficient to state that the pulse forming network serves both as a means for storing the energy of an output pulse and also as a pulse-shaping element. Any pulse forming network may be used in the present invention which will operate in the manner hereinafter described.

Connected in series between the terminals of network 28 are saturable reactors 30 and 32. Reactor 32 is provided with a source of biasing potential, such as battery 34. An output pulse transformer 36 is, in turn, connected in parallel with reactor 32. A magnetron or other suitable load device may be connected to output terminals 38 and 40. Choke coil $L_3$, like coil $L_2$, serves to prevent excessive A. C. currents from flowing through the bias voltage source 34.

All of the saturable inductances in the circuit of Fig. 1 are wound on cores of square hysteresis loop material. The hysteresis curve for this type of material is shown in Figs. 4a and 4b. In accordance with the well known magnetic theory, the quantity H represents the field intensity at any instant and is measured in ampere-turns per unit of length. The quantity B represents flux density at any instant and is measured in webers per square unit of area. It can be seen that the core material presents a sharp cutoff point between conditions of saturation (i. e., constant B as H increases) and unsaturation. When a reactor is saturated, it will, of course, present a much lower impedance than when unsaturated. If an alternating current voltage is applied to the reactor, it may advance from point 1 on the charging cycle in Fig. 4a along the path of the arrows to point 2 and then back down the other side of the curve to point 1. The cycle from point 1 to point 2 and back to point 1 represents one 360 degree cycle of the applied alternating current voltage. The location of points 1 and 2 depends upon the amplitude of the applied voltage. If the amplitude of the applied voltage is small enough, saturation may never take place. This is illustrated in Fig. 4a by the points 1' and 2'. The cycle never reaches the saturation points, but follows the dotted lines before reaching saturation.

The field intensity H varies in direct proportion to ampere-turns which are, in turn, dependent upon applied voltage. Therefore, by applying a fixed bias voltage to the reactor, it can be made to saturate in one direction only. This factor is illustrated in Fig. 4b. By applying a bias voltage, the point 2 can be made to shift to the right by the amount H'. The point 1 is now located on the steep side of the curve so that the reactor saturates in one direction only. By reversing the polarity of the bias voltage, point 1 can be made to shift to the left by distance H'; and, under this condition, point 2 will not be in the saturation range.

One further point should be made before proceeding with a description of operation of the invention. The induced voltage equation for an inductor is:

$$B = -\frac{10^8}{NA}\int e\,dt$$

where $B$ = flux density;
$N$ = number of turns of wire in the winding of the inductor;
$A$ = cross sectional area of the core of the inductor;
$e$ = voltage; and
$t$ = time in seconds.

It can be seen that the flux density depends upon the product $\int e\,dt$, measured in volt seconds. In other words, the flux density depends upon the applied voltage and the time duration of that voltage. It is, therefore, possible to achieve a particular value of flux density B with many different voltage levels by varying the time duration of the different voltage levels so that the product $\int e\,dt$ is always the same. It, of course, follows that it is possible to reach the saturation level of flux density with many different variations of the factor $\int e\,dt$.

Referring again to Fig. 1, the operation of the circuit is as follows: All of the saturable reactors and transformers of the circuit operate in the manner just described. On one half cycle of the alternating current source 10, capacitor 16 will charge with the instantaneous polarity shown. Battery 24 and winding 22 serve to bias transformer 14 so that it saturates when its upper terminal is positive. Therefore, when the amplitude and time duration of the applied voltage reach predetermined values, transformer 12 will saturate and capacitor 16 will discharge through the transformer. Saturable reactor 32 is biased by battery 34 so that its lower terminal assumes a positive polarity. Reactor 32 will, therefore, easily saturate and present a low impedance to the discharge currents from capacitor 16. This impedance is lower than the impedance of either the lower portion of reactor 18, network 28, or transformer 36. The reactor 30 is such that it will easily saturate in either direction when the product $\int e\,dt$ is relatively small. Therefore, the discharge currents from capacitor 16 will flow through saturated reactor 32 and the reactor 30 (which easily saturates in response to voltages of the amplitude and time duration applied) to charge capacitor 26 with the instantaneous polarity shown.

After capacitor 26 is charged, it cannot discharge through reactor 32 which will now present a high impedance to reverse currents. It will, therefore, discharge through reactor 18 (which now saturates) to charge the pulse forming network 28 with the instantaneous polarity shown. The accumulation of the charge in the pulse forming network is comparatively slow, and, therefore, reactor 30 will not saturate immediately. This gives the pulse forming network an opportunity to assume a relatively large voltage before discharging through the output load transformer 36. When reactor 30 does saturate, network 28 will discharge through transformer 36 to produce an output voltage pulse. Reactor 32 will present a high impedance to discharge currents from network 28 since it is biased to present a low impedance to currents flowing in the opposite direction.

On the other half cycle of the alternating current source 10, when the instantaneous polarities on capacitor 16 are reversed, a negligible amount of current will flow through the circuit to charge capacitor 26 with the polarity shown. However, the magnitude of the voltage induced on the capacitor 26 is not sufficient to produce an output pulse.

The circuit of Fig. 2 is identical with that of Fig. 1 except that reactor 30 is now placed between reactor 32 and pulse transformer 36 rather than between capacitor 26 and reactor 32. In this way, the charging currents need not flow through reactor 30, but reactor 30 still serves its purpose in allowing a relatively large voltage to accumulate in network 28 before discharge.

In Fig. 3, the shunt reactor 32 is eliminated and replaced by a saturating output pulse transformer 42. A source of saturating voltage, such as battery 34, serves to bias the transformer in the same direction as reactor 32. The operation of the circuit is the same as that of the previous arrangements except that both charging and discharge currents flow through transformer 42. A high impedance is presented to discharge currents which produce an output pulse across the third winding, whereas a low impedance is presented to charging currents by virtue of the bias voltage supplied by battery 34. This arrangement not only eliminates the shunting reactors of Figs. 1 and 2 but should also result in a smaller pulse transformer since the material of the saturating core used in conjunction with the bias should permit a larger flux swing and, hence, result in a smaller and more efficient pulse transformer.

Although the invention has been described in connection with certain specific embodiments, it will be apparent to those skilled in the art that various changes in form and arrangement of parts can be made to suit requirements without departing from the spirit and scope of the invention.

I claim as my invention:

1. Pulse generating apparatus including a source of alternating current voltage, a first saturable reactor inductively coupled to said source of voltage, means for biasing said first reactor so that it will saturate during one half of each cycle of said alternating current source, a first capacitor and a second saturable reactor connected in series between the ends of said first reactor, a second capacitor chargeable by energy stored in said first capacitor, a charging path for said second capacitor including third and fourth saturable reactors, a discharge path of said second reactor including an energy storing device connected in parallel with said third and fourth reactors, a load impedance responsive to voltages developed across said third reactor, and means for biasing said third reactor so that it presents a low impedance to charging currents for said second capacitor and a high impedance to currents resulting from the discharge of said energy storing device.

2. The combination claimed in claim 1 wherein the fourth saturable reactor is designed to saturate during the charging period of said second capacitor and also during discharge of said energy storing device.

3. Pulse generating apparatus including a source of alternating current voltage, a first saturable reactor inductively coupled to said source of voltage, means for biasing said reactor so that it will saturate during one half of each cycle of said alternating current voltage source, a first capacitor and a second saturable reactor connected in series between the ends of said first reactor, a second capacitor chargeable by energy stored in said first capacitor, third and fourth serially-connected saturable reactors, a charging path for said second capacitor including said first, third and fourth saturable reactors, a pulse forming network, a discharge path for said second capacitor including said second saturable reactor and said pulse forming network, a load impedance connected in parallel with said third reactor, and means for biasing said third reactor so that it presents a low impedance to charging currents for said second capacitor and a high impedance to currents resulting from the discharge of said pulse forming network.

4. Pulse generating apparatus including a source of alternating current voltage, a first saturable reactor inductively coupled to said source of voltage, means for biasing said reactor so that it will saturate during one half of each cycle of said alternating current voltage source, a first capacitor and a second saturable reactor connected between the ends of said first reactor, a second capacitor chargeable by energy stored in said first capacitor, a charging path for said second capacitor including a third saturable reactor, a pulse forming network connected in parallel with said third reactor, a discharge path for said second capacitor including said second reactor and said pulse forming network, a fourth saturable reactor and a load impedance connected in series between the ends of said third reactor, and means for biasing said third reactor so that it will saturate in response to charging currents for said second capacitor.

5. A pulse generator comprising a source of voltage pulses, a capacitor chargeable in response to said voltage pulses, a charging path for said capacitor including first and second saturable reactors, a discharge path for said capacitor including a pulse forming network connected in parallel with said first and second reactors, a load impedance connected in parallel with said first reactor, and means for biasing said first reactor so that it will present a low impedance to charging currents for said capacitor.

6. A pulse generator comprising a source of voltage pulses, a capacitor chargeable in response to said voltage pulses, a charging path for said capacitor including first and second saturable reactors, a discharge path for said capacitor including a pulse forming network connected in parallel with said first and second reactors, a load impedance inductively coupled to said first reactor, and means for biasing said first reactor so that it presents a low impedance to charging currents for said capacitor.

7. A pulse generator comprising a source of voltage pulses, a capacitor chargeable in response to said voltage pulses, a charging path for said capacitor including a first saturable reactor, a pulse forming network connected in parallel with said first reactor, a discharge path for said capacitor including said pulse forming network, a load impedance and a second saturable reactor connected in series between the opposite ends of said first reactor, and means for biasing said first reactor so that it will present a low impedance to charging currents for said capacitor.

8. A pulse generator comprising a source of voltage pulses, a capacitor chargeable in response to said voltage pulses, first and second saturable reactors, a charging path for said capacitor including at least one of said reactors, a pulse forming network, a discharge path for said capacitor including said pulse forming network, a load impedance coupled to said pulse forming network, and means for biasing said one reactor to present a low impedance to charging currents for said capacitor.

9. A pulse generator comprising a source of voltage pulses, a capacitor chargeable by said voltage pulses, a charging path for said capacitor including a saturable reactor, a discharge path for said capacitor including a pulse forming network, a load impedance coupled to said pulse forming network, and means for biasing said saturable reactor to present a low impedance to charging currents for said capacitor.

10. Pulse generating apparatus comprising a pulse forming network, charging means for said network including a pair of serially connected saturable reactors connected between the terminals of said pulse forming network, a load impedance connected in parallel with one of said saturable reactors, and means for biasing said one reactor to present an impedance higher than said load impedance during discharge of said network.

11. Pulse generating apparatus comprising a pulse forming network, charging means for said network including a first saturable reactor connected in parallel with said pulse forming network, a load impedance and a second saturable reactor connected in series between the opposite ends of said first reactor, and means for biasing said first reactor to present an impedance higher than said load impedance during discharge of said pulse forming network.

12. Pulse generating apparatus comprising a two-terminal pulse forming network, a saturable pulse transformer, a saturable reactor, means connecting said reactor and the primary winding of said pulse transformer in series between the terminals of said pulse forming network, apparatus for charging said network with electrical energy, and means for biasing said primary winding to present a high impedance to currents resulting from discharge of said pulse forming network.

No references cited.